US012748765B2

(12) United States Patent
Yu

(10) Patent No.: US 12,748,765 B2
(45) Date of Patent: Sep. 29, 2026

(54) INTERACTION METHOD AND APPARATUS, AND ELECTRONIC DEVICE AND STORAGE MEDIUM

(71) Applicant: BEIJING ZITIAO NETWORK TECHNOLOGY CO., LTD., Beijing (CN)

(72) Inventor: Qin Yu, Beijing (CN)

( * ) Notice: Subject to any disclaimer, the term of this patent is extended or adjusted under 35 U.S.C. 154(b) by 0 days.

(21) Appl. No.: 18/711,552

(22) PCT Filed: Nov. 11, 2022

(86) PCT No.: PCT/CN2022/131283
§ 371 (c)(1),
(2) Date: May 17, 2024

(87) PCT Pub. No.: WO2023/088172
PCT Pub. Date: Feb. 25, 2023

(65) Prior Publication Data
US 2025/0021574 A1 Jan. 16, 2025

(30) Foreign Application Priority Data
Nov. 18, 2021 (CN) ......................... 202111384435.7

(51) Int. Cl.
*G06F 16/248* (2019.01)

(52) U.S. Cl.
CPC .................................. *G06F 16/248* (2019.01)

(58) Field of Classification Search
CPC ............................. G06F 3/0237; G06F 3/0481
See application file for complete search history.

(56) References Cited

U.S. PATENT DOCUMENTS 8,601,019 B1 * 12/2013 Weininger ........ G06F 16/90324
707/769
8,650,210 B1 2/2014 Cheng et al.
(Continued)

FOREIGN PATENT DOCUMENTS

CN 104866623 A 8/2015
CN 105224661 A 1/2016
(Continued)

OTHER PUBLICATIONS

China National Intellectual Property Administration, Notice of Allowance Issued in Application No. 202111384435.7, Feb. 21, 2025, 8 pages.
(Continued)

*Primary Examiner* — Dawaune A Conyers
(74) *Attorney, Agent, or Firm* — Alleman Hall LLP

(57) ABSTRACT

Disclosed in the embodiments of the present disclosure are an interaction method and apparatus, and an electronic device and a storage medium. The method includes: after the current user inputs, in a target interface, a preset identification character, performing real-time detection on target information which is input by the current user, so as to determine whether the current target information meets a preset condition; when the current target information does not meet the preset condition, executing preset search logic on the basis of the target information, so as to determine a search result; and displaying, in the target interface, the search result at an associated position of the target information.

14 Claims, 3 Drawing Sheets

(56) References Cited

U.S. PATENT DOCUMENTS

| | | | | |
|---|---|---|---|---|
| 8,756,499 | B1 | 6/2014 | Kataoka et al. | |
| 2010/0010815 | A1* | 1/2010 | Bells | G10L 13/027 704/260 |
| 2015/0205822 | A1* | 7/2015 | Jain | G06F 16/24578 707/803 |
| 2015/0269175 | A1* | 9/2015 | Espenshade | G06F 16/90324 706/47 |
| 2018/0302459 | A1* | 10/2018 | Häusler | G06F 16/248 |
| 2019/0018885 | A1 | 1/2019 | Wakankar et al. | |
| 2022/0075941 | A1* | 3/2022 | Huang | G06F 40/274 |

FOREIGN PATENT DOCUMENTS

| | | | |
|---|---|---|---|
| CN | 105335415 | A | 2/2016 |
| CN | 104123012 | B | 5/2016 |
| CN | 106681598 | A | 5/2017 |
| CN | 107291772 | A | 10/2017 |
| CN | 110190975 | A | 8/2019 |
| CN | 111143524 | A | 5/2020 |
| CN | 112068699 | A | 12/2020 |
| CN | 114063795 | A | 2/2022 |
| WO | 2010124509 | A1 | 11/2010 |

OTHER PUBLICATIONS

China National Intellectual Property Administration, Office Action and Search Report Issued in Application No. 202111384435.7, Jul. 12, 2024, 18 pages.

ISA China National Intellectual Property Administration, International Search Report and Written Opinion Issued in Application No. PCT/CN2022/131283, Jan. 20, 2023, WIPO, 13 pages.

* cited by examiner

INTERACTION METHOD AND APPARATUS, AND ELECTRONIC DEVICE AND STORAGE MEDIUM

CROSS-REFERENCE TO RELATED APPLICATIONS

The present disclosure is a U.S. National Stage Application under 35 U.S.C. § 371 of International Patent Application No. PCT/CN2022/131283, filed on Nov. 11, 2022, which is based on and claims priority of Chinese application for invention No. 202111384435.7, filed on Nov. 18, 2021, the disclosure of which is hereby incorporated into this disclosure by reference in its entirety.

TECHNICAL FIELD

This disclosure relates to the field of information technology, particularly to an interaction method and apparatus, an electronic device, and a storage medium.

BACKGROUND

With the rapid development of terminal and network technology, an increasing number of social applications have emerged, which enable online interaction between different users based on these social applications.

SUMMARY

In a first aspect, some embodiments of the present disclosure provide an interaction method, comprising:

- in response to a current user entering a preset identification character on a target interface, performing a real-time detection on current target information entered by the current user to determine whether the current target information meets a preset condition;
- in response to the current target information not meeting the preset condition, executing a preset search logic based on the current target information to determine a search result;
- displaying the search result at an associated location of the current target information on the target interface.

In a second aspect, some embodiments of the present disclosure further provide an interaction apparatus, comprising:

- a detection module for, in response to a current user entering a preset identification character on a target interface, performing a real-time detection on current target information entered by the current user to determine whether the current target information meets a preset condition;
- a search module for, in response to the current target information not meeting the preset condition, executing a preset search logic based on the current target information to determine a search result;
- a display module for displaying the search result at an associated location of the current target information on the target interface.

In a third aspect, some embodiments of the present disclosure provide an electronic device, comprising:

- one or more processors;
- a storage device for storing one or more programs that,
- when executed by the one or more processors, cause the one or more processors to implement the above interaction method.

In a fourth aspect, some embodiments of the present disclosure further provide a non-transitory computer storage medium stored thereon a computer program that, when executed by a processor, implements the above interaction method.

In a fifth aspect, some embodiments of the present disclosure further provide a computer program, comprising: instructions that, when executed by a processor, cause the processor to implement the interaction method of any embodiments above.

In a sixth aspect, some embodiments of the present disclosure further provide a computer program product, comprising: instructions that, when executed by a processor, cause the processor to implement the interaction method of any embodiments above.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
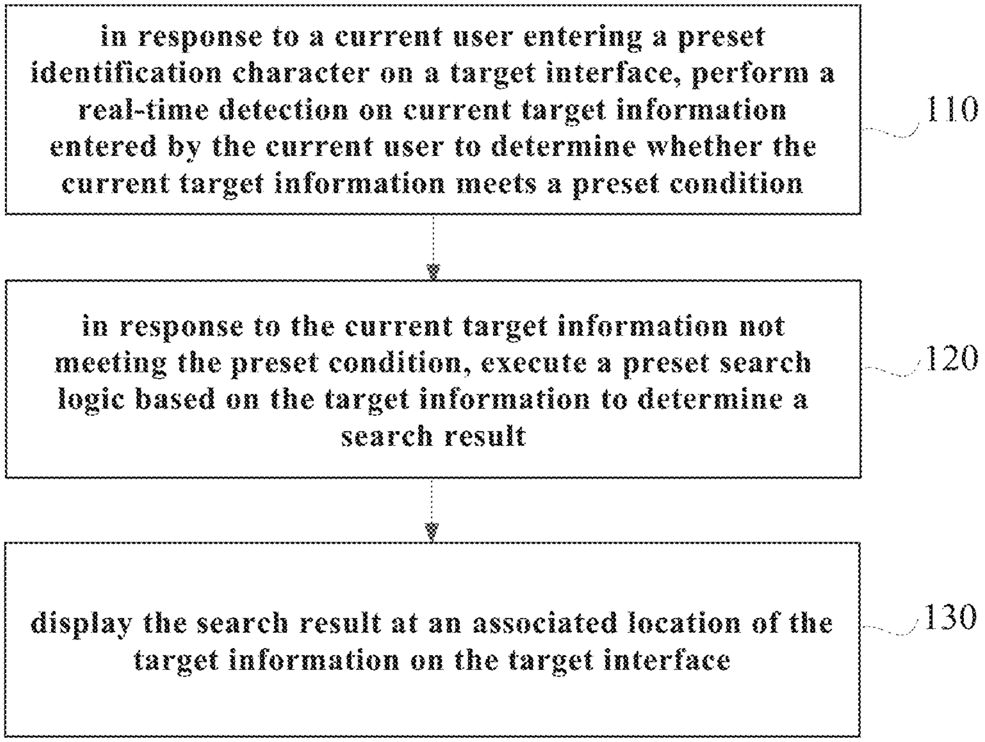
FIG. 1 is a flowchart of an interaction method provided in some embodiments of the present disclosure.

Exemplary embodiments of the present disclosure will now be described in detail with reference to the accompanying drawings. Although some embodiments of the present disclosure are shown, it should be understood that the present disclosure may be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term “comprising” and its variants as used herein is an open-ended mode expression, that is, “comprising but not limited to”. The term “based on” means “based at least in part on”. The term “one embodiment” means “at least one embodiment”; the term “another embodiment” means “at least one additional embodiment”; The term “some embodiments” means “at least some embodiments”. Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

In some social applications, in response to a current user wanting to mention another user, the current user needs to enter a preset character, such as @, into an input box. After the current user enters the @ character, the social application automatically searches based on the user's input and provides a list of candidates for the current user, making it convenient for the current user to quickly find the target user to be mentioned.

As mentioned above, in response to a current user entering a character @ without the need to mention another user, the interaction methods in the related arts cause certain difficulties for the current user and interfere with the current user's normal input.

In order to solve or at least partially solve the above technical problem, the present disclosure provides an interaction method and apparatus, an electronic device and a storage medium for facilitating the enhancement of user experience.

FIG. 1 is a flowchart of an interaction method provided in some embodiments of the present disclosure. This method may be performed by an interaction apparatus, which may be implemented in software and/or hardware. The apparatus may be configured in electronic devices, such as display terminals, comprising but not limited to smartphones, handheld computers, tablets, portable and wearable devices, smart home devices (such as desk lamps), and other electronic devices with display screens.

As shown in FIG. 1, the method may comprise the following steps.

In step 110, in response to a current user entering a preset identification character on a target interface, a real-time detection is performed on current target information entered by the current user to determine whether the current target information meets a preset condition.

Exemplarily, the preset identification character may be pre-specified and written into the code of the application. Exemplarily, target interface may be an interface that comprises a comment input area, an interface that comprises a text content input area, or a conversation interface. The preset identification character may be "@". In response to the current user using the application, after entering the preset identification character "@" in the input area (such as an input box) on the interaction interface, the application assumes that the current user has the intent to search for another user. The application automatically executes a preset search logic, determine a search result, and display the search result on the interaction interface to facilitate the user to quickly select a desired result. After the current user selects a user to be mentioned, i.e., a user mentioned via @, the user mentioned via @ receive a notification message. In the related arts, especially in applications that support fuzzy matching, in response to a user entering "@", but not based on the preset search logic, the application still executes the preset search logic and display search results, which degrades the user experience.

In the embodiments above, the current user may enter information related to a desired target result after the preset identification character "@". For example, in the @ another user scenario (i.e., to mention another user via @), the target information may be a nickname of another user that the current user wishes to mention. In response to the application detecting that the current user continues to enter target information after entering the preset identification character "@", a real-time detection may be performed on the target information entered by the current user to determine whether the current target information meets a preset condition. The preset condition is configured to indicate whether the current user is not based on the preset search logic. In response to the current user being based on the preset search logic, the current user performs a user search based on a user's nickname. That is, in response to the preset condition being not met, the search process continues based on the target information entered by the current user to display a list of other users that the current user would like to mention, making it easier for the current user to quickly find another user to mention from the list, thereby improving the user experience.

In step 120, in response to the current target information not meeting the preset condition, a preset search logic is executed based on the current target information to determine a search result.

In response to the current target information not meeting the preset condition, it indicates that the current user is based on the preset search logic described above. In this case, a preset search logic is executed based on the target information to determine a search result.

In some embodiments, the target information that the current user enters after the preset identification character "@" may represent the current user's actual intent in entering the preset identification character "@". The first case is that the true intent of the current user who entered the preset identification character "@" is to search for a target result, such as search for another user desired to mention. In this case, the target information entered after the preset identification character "@" is configured to represent relevant information of another user that the current user desires to mention, such as the first or second letter of the nickname or the entire nickname of the user that the current user desires to mention, to assist the application in finding the user that the current user desires to mention. The second case is that the actual intent of the current user who entered the preset identification character "@" is to use it only as an "@" character without the intent of mentioning another user.

In the second case, the application may no longer search based on the target information entered after the preset identification character "@" to avoid wasting terminal system resources, may no longer display search results to avoid inconveniencing the current user, such as interfering with the current user's input operation. Thus, in order to improve the user's interaction experience, it is necessary to determine the current user's actual intent to determine whether to execute a preset search logic based on the current user's actual intent.

Exemplarily, in response to the current target information not meeting the preset condition, the preset search logic is executed based on the target information to determine a search result and display the search result at an associated location of the target information on the target interface; in response to the target information being determined to meet the preset condition, the execution of the preset search logic is canceled and the search result already displayed on the target interface are hidden to avoid inconvenience to the current user and to reduce interference with the current user, such as obstructing the current user's input operation or obstructing the current user from browsing a region covered by the search result.

In some embodiments, the current target information is input into a preset network model to determine whether the current target information meets the preset condition through the preset network model.

In some embodiments, the preset network model is configured to determine whether the current user is based on a preset search logic. In response to the current user being based on a preset search logic, it is determined that the target information does not meet the preset condition. In this case, the preset search logic is executed and search results are displayed to help the current user quickly find a desired result. In this way, the current user's interaction needs may be satisfied. In response to the current user not being based on a preset search logic, it is determined that the target information meets the preset condition. In this case, the preset search logic is not executed, and no search results are displayed to avoid disruption and inconvenience to the current user. In this way, the input needs of the current user is satisfied and the goal of improving the interaction experience is achieved.

Exemplarily, a determination condition is obtained based on the current target information, and the determination condition is input into the preset network model to determine whether the current target information meets the preset condition through the preset network model.

Exemplarily, the determination condition comprise at least one of: a character comprised in the target information; a total length of the target information. In some embodiments, the preset network model is configured to determine whether the character contained in the target information comprise a preset character, wherein the preset character is unrelated to the preset search logic. Exemplarily, the target information may comprise a preset character, wherein the preset character is a character which may not allowed to be comprised according to the preset search logic. For example, in response to the preset search logic being to search for a user based on the user's nickname, and the target information comprising emoticons that are not allowed to be comprised in the user's nickname, it may be determined that the current user's actual intent in entering the preset identification character @ is not to mention another user, or that the current user does not search for another user. In this case, it is determined that the target information meets the preset condition and the preset search logic is canceled. In response to the target information before the emoticons entered by the current user does not meet the preset condition, a search result list is displayed on the interaction interface. After the current user enters the emoticons, the search result list is hidden, i.e., the display of the search result list is canceled and the search result list is no longer displayed.

In other embodiments, in response to the total length of the target information being detected to reach a threshold determined based on the preset network model, which means that the total length of the target information is too long, it may be determined that the current user does not have a search need. In this case, the applications in the related arts still provide search results by fuzzy matching. However, it is normal practice for the current user to perform a selection operation to select the target user to be mentioned in response to a suitable target user may be matched based on the first few characters entered by the current user. Therefore, it may be determined that the current user's actual intent in entering the preset identification character @ is not to mention another user, or that the current user is not based on a preset search logic. In this case, the target information is determined to satisfy the preset condition and the preset search logic is canceled.

In step 130, the search result are displayed at an associated location of the current target information on the target interface.

Exemplarily, the search result is displayed at an associated location of an input area for the target information used for entering the target information to facilitate the current user to select a desired target result from the search result.

The technical solution provided in the embodiments of the present disclosure has at least the following beneficial effects over the related art.

In the interaction method provided by the embodiments of the present disclosure, in response to a current user entering a preset identification character on a target interface, a real-time detection is performed on target information entered by the current user to determine whether the current target information meets a preset condition; in response to the current target information not meeting the preset condition, a preset search logic is executed based on the target information to determine a search result and display the search result at an associated location of the target information on the target interface. In this way, after entering the preset identification character on the target interface, an automatic search is performed and search results are displayed only in response to the target information entered by the current user in real time not meeting the preset condition. Whether the user actually being based on a preset search logic is determined by whether the preset condition is met, which may facilitate the user's next operation and provide a good interactive experience for the user.

In the interaction method provided by the embodiments of the present disclosure, in response to a determination that the current user is based on a preset search logic, a search is performed based on the target information entered after the preset identification character, and the search result are displayed; as the user continues to enter the target information, in response to a determination that the current user is not based on a preset search logic based on the target information, the preset search logic is canceled and the displayed search results are hidden to avoid inconvenience to the current user's interaction operation, thereby achieving the goal of improving the interaction experience.

Figure 2:
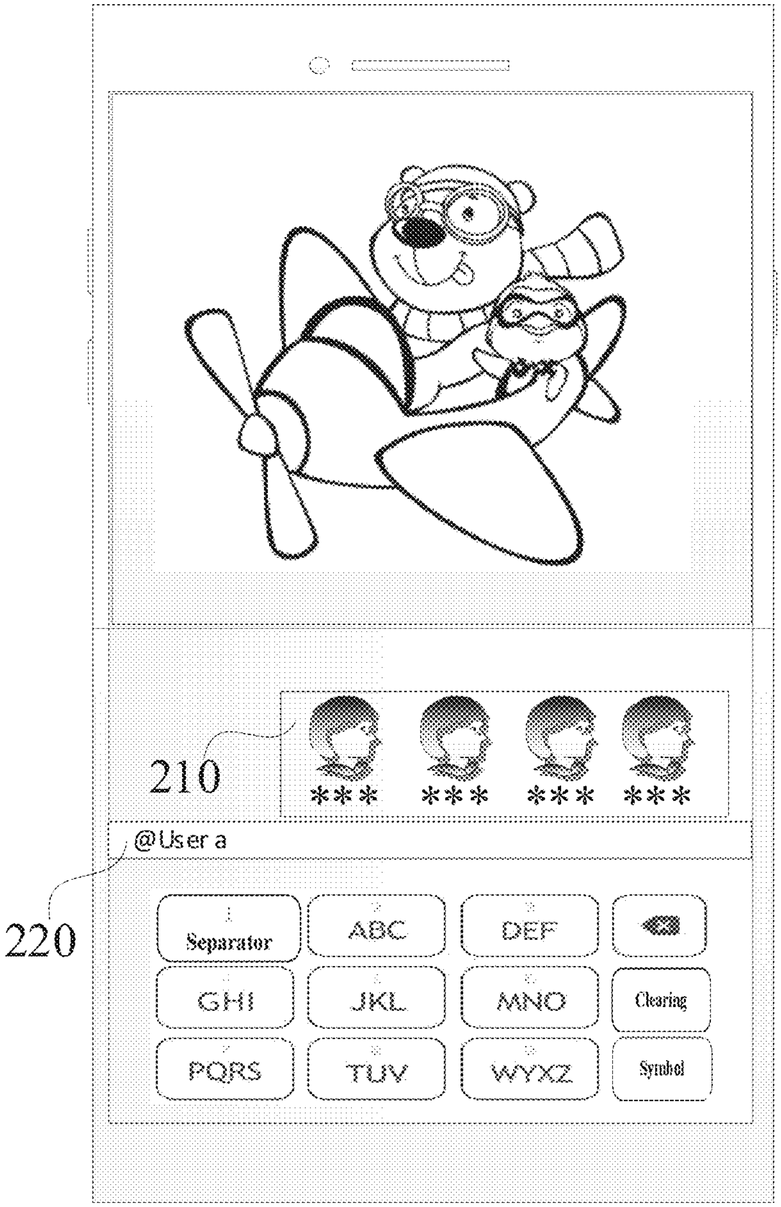
FIG. 2 is a schematic diagram of an interaction interface provided in some embodiments of the present disclosure.

On the basis of the above embodiments, referring to the schematic diagram of an interaction interface shown in FIG. 2, search results 210 are displayed at an associated location of an input area for the target information 220, wherein the input area is configured to input the target information. The current user may input the nickname of another user which the current user wants to mention in the input area 220, and search results 210 may be displayed above the input area 220, making it convenient for the current user to select a desired user from the search results 210. The search results 210 may be users avatars and nicknames.

In some embodiments, user information is searched based on the target information to obtain the search result comprising the user information; the user information is, for example, user nicknames. In some embodiments, the target information may be fuzz matched with user nicknames, and users whose nicknames have a high matching degree of the target information may be used as search results.

In some embodiments, before executing the preset search logic, a user with a frequency of interaction with the current user reaching a frequency threshold is determined as a candidate user; the search result determined and displayed based on the candidate user. In some embodiments, after the current user enters "@" and before the target information is entered, the application automatically displays users with higher interaction frequency as candidate users for selection by the current user to achieve the purpose of quickly providing search results for the current user.

In some embodiments, a user of which a user identification with a matching degree of the target information greater than a preset threshold is determined as a candidate user; the candidate user is used as the search result. That is, the search result is determined based on user identifiers.

In some embodiments, candidate users may be first determined based on user identifiers and then a second filtering is performed on the candidate users based on the frequency of interaction with the current user.

Figure 3:
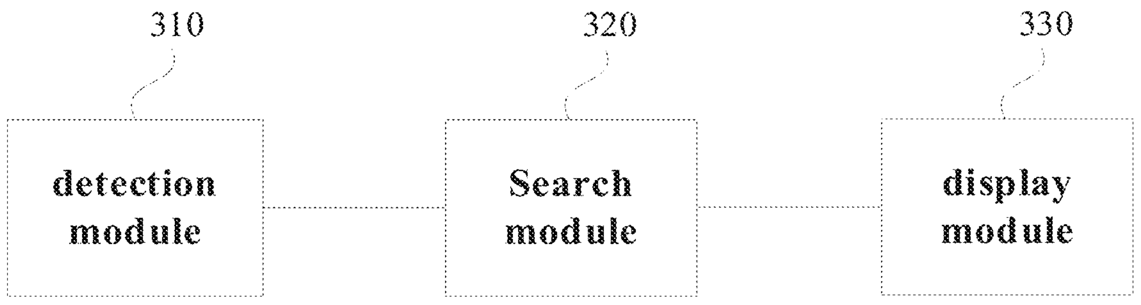
FIG. 3 is a schematic structure diagram of an interaction apparatus provided in some embodiments of the present disclosure.

FIG. 3 is a schematic structure diagram of an interaction apparatus provided in some embodiments of the present disclosure. As shown in FIG. 3, the interaction apparatus comprises: a detection module 310, a search module 320, and a display module 330.

The detection module 310 is used for, in response to a current user entering a preset identification character on a target interface, performing a real-time detection on target information entered by the current user to determine whether the current target information meets a preset condition. The search module 320 is used for, in response to the current target information not meeting the preset condition, executing a preset search logic based on the target information to determine a search result. The display module 330 is used for displaying the search result at an associated location of the target information on the target interface.

In some embodiments, the apparatus further comprises: a hiding module for canceling the execution of the preset search logic in response to the current target information meeting the preset condition being detected, and hiding the search result already displayed on the target interface.

In some embodiments, the detection module 310 comprises: a first determination unit for inputting the current target information into a preset network model to determine whether the current target information meets the preset condition through the preset network model. The preset network model is configured to determine whether the current user is based on a preset search logic. In response to the current user being based on a preset search logic, it is determined that the current target information does not meet the preset condition.

In some embodiments, the first determination module is used for: obtaining a determination condition based on the current target information, and inputting the determination condition into the preset network model to determine whether the current target information meets the preset condition through the preset network model; wherein, the determination condition comprise at least one of: a character comprised in the target information, wherein the preset network model determines whether the character comprises a preset character, wherein the preset character is unrelated to the preset search logic; and a total length of the target information. In some embodiments, the display module is used for: displaying search results at an associated location of an input area for the target information, wherein the input area is configured to input the target information.

In some embodiments, the search module 320 comprises a first search unit for searching for user information based on the target information to obtain the search result comprising the user information.

In some embodiments, the search module 320 comprises a second search unit for searching for user information based on the target information to obtain the search result comprising the user information.

In some embodiments, the apparatus further comprises: a determination module for determining a user with a frequency of interaction with the current user reaching a frequency threshold as a candidate user before the execution of the preset search logic; determining and displaying the search result based on the candidate user.

In some embodiments, the search module 320 comprises a third search unit for determining a user of which a user identification with a matching degree of the target information greater than a preset threshold as a candidate user; using the candidate user as the search result.

In some embodiments, the search module 320 comprises a fourth search unit for determining a plurality of users with user identifiers matching the target information by degrees greater than a preset threshold as a plurality of candidate users; determining the search result based on frequencies of interaction between the plurality of candidate users and the current user.

In the interaction apparatus provided by the embodiment of the present disclosure, when it is determined that the current user is based on a preset search logic, a search is performed based on the target information entered after the preset identification character, and the search result are displayed; d as the user continues to enter the target information, if it is determined that the current user is not based on a preset search logic based on the target information, the preset search logic is canceled and the displayed search results are hidden to reduce inconvenience and interference to the current user's interaction operation, thereby achieving the goal of improving the interaction experience.

The interaction apparatus provided in the embodiments can execute the steps of the interaction method provided in some embodiments of the present disclosure. The steps involved and the beneficial effect achieved will not be described in detail.

Figure 4:
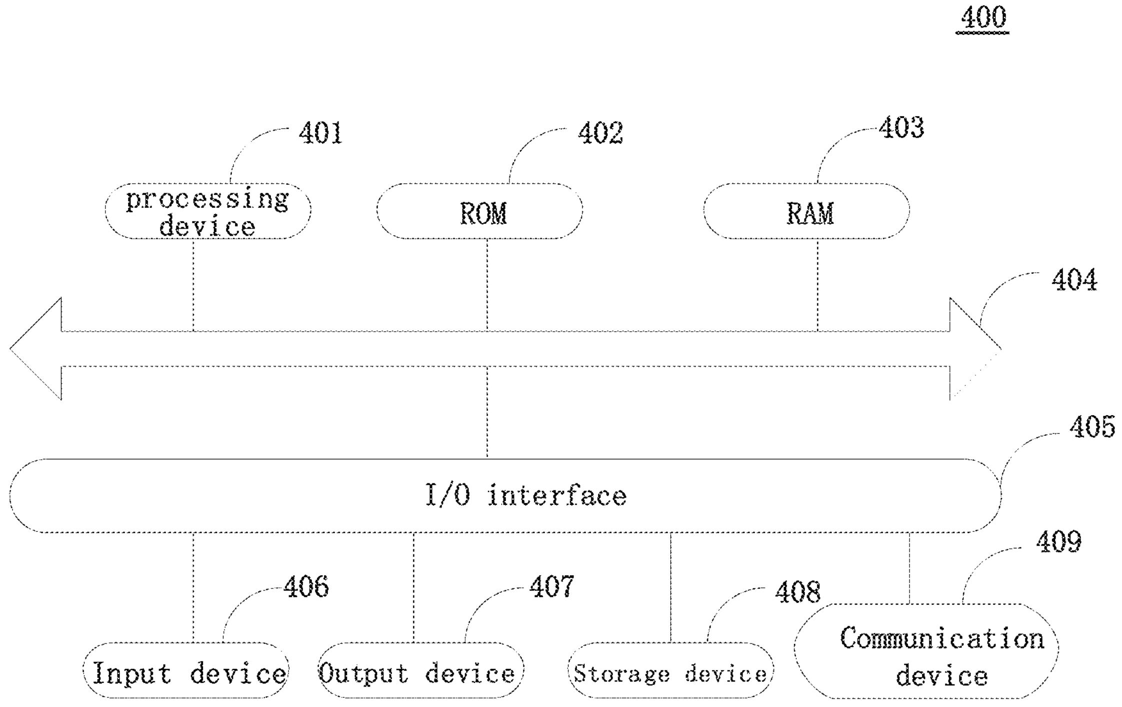
FIG. 4 is a schematic structural diagram of an electronic device provided in some embodiments of the present disclosure.

FIG. 4 is a schematic structural diagram of an electronic device provided in some embodiments of the present disclosure. Referring to FIG. 4, a schematic structural diagram of an electronic device 400 suitable for implementing the embodiments of the present disclosure is shown. The electronic device 400 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), or a wearable electronic device, and a fixed terminal such as a digital TV, a desktop computer, or a smart-home device. The electronic device shown in FIG. 4 is merely an example and should not impose any limitation on the function and scope of the embodiments of the present disclosure.

As shown in FIG. 4, the electronic device 400 may comprise a processing device (e.g., a central processing unit, a graphics processor) 401, which may perform various appropriate actions and processes to implement the method of the embodiment of the present disclosure according to a program stored in Read Only Memory (ROM) 402 or a program loaded from storage device 408 into Random Access Memory (RAM) 403. In RAM 403, various programs and data required for the operation of the electronic device 400 are also stored. Processing device 401, ROM 402 and RAM 403 are connected to each other through bus 404. An input/output (I/O) interface 405 is also connected to the bus 404.

Generally, the following devices may be connected to I/O interface 405: input devices 406 comprising, for example, a touch screen, a touch pad, a keyboard, a mouse, a camera, a microphone, an accelerometer, a gyroscope, etc.; output devices 407 comprising a liquid crystal display (LCD), a speaker, a vibrator, etc.; a storage device 408 such as a magnetic tape, a hard disk, etc.; and a communication device 409. The communication device 409 enables the electronic device 400 to communicate in a wireless or wired manner with other devices to exchange data. Although FIG. 4 shows the electronic device 400 with various components, it should be understood that it is not required to implement or have all of these components. Alternatively, more or fewer components may be implemented or provided.

In particular, according to some embodiments of the present disclosure, the processes described above with reference to the flowchart may be implemented as a computer software program. For example, some embodiments of the present disclosure comprises a computer program product, which comprises a computer program carried on a non-transitory computer readable medium, and containing program code for executing the method shown in the flowchart to implement the above method. In such embodiments, the computer program may be downloaded and installed from the network through the communication device 409, or installed from the storage device 408, or from the ROM 402. When the computer program is executed by the processing device 401, the above functions defined in the method of the embodiment of the present disclosure are performed.

It should be noted that the computer readable medium in the present disclosure may be a computer readable signal medium or a computer readable storage medium, or any combination of thereof. The computer readable storage medium may be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium may be any tangible medium that can contain or store a program, which may be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium may be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and may be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer readable medium may be comprised in the electronic device described above; or it may exist alone without being assembled into the electronic device.

The computer readable medium carries one or more programs that, when executed by the electronic device, cause the electronic device to perform steps of:

in response to a current user entering a preset identification character on a target interface, performing a real-time detection on target information entered by the current user to determine whether the current target information meets a preset condition; in response to the current target information not meeting the preset condition, executing a preset search logic based on the target information to determine a search result; displaying the search result at an associated location of the target information on the target interface.

In some embodiments, when the electronic device performs the above one or more programs, the electronic device may also perform other steps in the above embodiments.

The computer program code for executing operations of the present disclosure may be complied by any combination of one or more program design languages, the program design languages comprising object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units involved in the embodiments described in the present disclosure may be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that may be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides an interaction method, comprising: in response to a current user entering a preset identification character on a target interface, performing a real-time detection on current target information entered by the current user to determine whether the current target information meets a preset condition; in response to the current target information not meeting the preset condition, executing a preset search logic based on the current target information to determine a search result and display the search result at an associated location of the current target information on the target interface.

According to one or more embodiments of the present disclosure, in the interaction method provided in the present disclosure, in some embodiments, the execution of the preset search logic is canceled in response to the current target information meeting the preset condition being detected, and the search result already displayed on the target interface are hidden.

According to one or more embodiments of the present disclosure, in the interaction method provided in the present disclosure, in some embodiments, determining whether the current target information meets a preset condition comprises: inputting the current target information into a preset network model to determine whether the current target information meets the preset condition through the preset network model.

According to one or more embodiments of the present disclosure, in the interaction method provided in the present disclosure, in some embodiments, the preset network model is configured to determine whether the current user is based on the preset search logic, and in response to the current user being based on a preset search logic, it is determined that the current target information does not meet the preset condition.

According to one or more embodiments of the present disclosure, in the interaction method provided in the present disclosure, in some embodiments, inputting the current target information into a preset network model to determine whether the current target information meets the preset condition through the preset network model comprises: obtaining a determination condition based on the current target information, and inputting the determination condition into the preset network model to determine whether the current target information meets the preset condition through the preset network model.

According to one or more embodiments of the present disclosure, in the interaction method provided in the present disclosure, in some embodiments, the determination condition comprise at least one of: a character comprised in the current target information, wherein the preset network model determines whether the character comprises a preset character, wherein the preset character is unrelated to the preset search logic; and a total length of the current target information.

In some embodiments, the preset network model is configured to determine whether the character comprises a preset character, wherein the preset character is unrelated to the preset search logic; in response to the characters comprising the preset character, it is determined that the current target information meets the preset condition.

In some embodiments, it is determined whether the total length of the current target information reaches a threshold, wherein the threshold is determined based on the preset network model; in response to the total length of the current target information reaching the threshold, it is determined that the current target information meets the preset condition.

According to one or more embodiments of the present disclosure, in the interaction method provided in the present disclosure, in some embodiments, displaying the search result at an associated location of the current target information on the target interface comprises: displaying search results at an associated location of an input area for the current target information, wherein the input area is configured to input the current target information.

According to one or more embodiments of the present disclosure, in the interaction method provided in the present disclosure, in some embodiments, executing a preset search logic based on the current target information to determine a search result comprises: searching for user information based on the current target information to obtain the search result comprising the user information.

According to one or more embodiments of the present disclosure, in the interaction method provided in the present disclosure, in some embodiments, before executing a preset search logic, the method further comprises: determining a user with a frequency of interaction with the current user reaching a frequency threshold as a candidate user; determining and displaying the search result based on the candidate user. According to one or more embodiments of the present disclosure, in the interaction method provided in the present disclosure, in some embodiments, executing a preset search logic to determine a search result comprises: determining a user of which a user identification with a matching degree of the current target information greater than a preset threshold as a candidate user; using the candidate user as the search result.

According to one or more embodiments of the present disclosure, in the interaction method provided in the present disclosure, in some embodiments, executing a preset search logic to determine a search result comprises: determining a plurality of users with user identifiers matching the current target information by degrees greater than a preset threshold as a plurality of candidate users; determining the search result based on frequencies of interaction between the plurality of candidate users and the current user.

In some embodiments, the plurality of candidate users are sorted in a descending order of the frequencies of interaction; and a preset number of top-ranked candidate users are selected as the search result.

According to one or more embodiments of the present disclosure, the present disclosure provides an interaction apparatus, comprising: a detection module for, in response to a current user entering a preset identification character on a target interface, performing a real-time detection on current target information entered by the current user to determine whether the current target information meets a preset condition; a search module for, in response to the current target information not meeting the preset condition, executing a preset search logic based on the current target information; a display module for displaying the search result at an associated location of the current target information on the target interface.

According to one or more embodiments of the present disclosure, in the interaction apparatus provided in the present disclosure, in some embodiments, the apparatus further comprises: a hiding module for canceling the execution of the preset search logic in response to the current target information meeting the preset condition being detected, and hiding the search result already displayed on the target interface.

According to one or more embodiments of the present disclosure, in the interaction apparatus provided in the present disclosure, in some embodiments, the detection module comprises: a first determination unit for inputting the current target information into a preset network model to determine whether the current target information meets the preset condition through the preset network model. The preset network model is configured to determine whether the current user is based on the preset search logic. in response to the current user being based on a preset search logic, it is determined that the current target information does not meet the preset condition.

According to one or more embodiments of the present disclosure, in the interaction apparatus provided in the present disclosure, in some embodiments, the first determination unit is used for: obtaining a determination condition based on the current target information, and inputting the determination condition into the preset network model to determine whether the current target information meets the preset condition through the preset network model; Wherein, the determination condition comprise at least one of: a character comprised in the current target information, wherein the preset network model determines whether the character comprises a preset character, wherein the preset character is unrelated to the preset search logic; and a total length of the current target information.

In some embodiments, the first determination unit determines, based on the preset network model, whether the character comprises a preset character, wherein the preset character is unrelated to the preset search logic; in response to the characters comprising the preset character, determines that the current target information meets the preset condition.

In some embodiments, the first determination unit determines whether the total length of the current target information reaches a threshold, wherein the threshold is determined based on the preset network model; in response to the total length of the current target information reaching the threshold, determines that the current target information meets the preset condition.

According to one or more embodiments of the present disclosure, in the interaction apparatus provided in the present disclosure, in some embodiments, the display module is used for: displaying search results at an associated location of an input area for the current target information, wherein the input area is configured to input the current target information.

According to one or more embodiments of the present disclosure, in the interaction apparatus provided in the present disclosure, in some embodiments, the search module comprises a first search unit for searching for user information based on the current target information to obtain the search result comprising the user information. According to one or more embodiments of the present disclosure, in the interaction apparatus provided in the present disclosure, in some embodiments, the search module comprises a second search unit for searching for user information based on the current target information to obtain the search result comprising the user information.

According to one or more embodiments of the present disclosure, in the interaction apparatus provided in the present disclosure, in some embodiments, the apparatus further comprises: a determination module for determining a user with a frequency of interaction with the current user reaching a frequency threshold as a candidate user before the execution of the preset search logic; determining and displaying the search result based on the candidate user.

According to one or more embodiments of the present disclosure, in the interaction apparatus provided in the present disclosure, in some embodiments, the search module comprises a third search unit for determining a user of which a user identification with a matching degree of the current target information greater than a preset threshold as a candidate user; using the candidate user as the search result.

According to one or more embodiments of the present disclosure, in the interaction apparatus provided in the present disclosure, in some embodiments, the search module comprises a fourth search unit for determining a plurality of users with user identifiers matching the current target information by degrees greater than a preset threshold as a plurality of candidate users; determining the search result based on frequencies of interaction between the plurality of candidate users and the current user.

In some embodiments, the fourth search unit sorts the plurality of candidate users in a descending order of the frequencies of interaction; and selects a preset number of top-ranked candidate users as the search result.

According to one or more embodiments of the present disclosure, the present disclosure provides an electronic device, comprising:

one or more processors;

a memory for storing one or more programs that, when executed by the one or more processors, cause the one or more processors to implement the interaction method provided by any embodiments of the present disclosure.

According to one or more embodiments of the present disclosure, the present disclosure provides a computer-readable medium stored thereon a computer program that, when executed by a processor, implements the interaction method provided by any embodiments of the present disclosure.

Some embodiments of the present disclosure further provide a computer program product comprising computer programs or instructions that, when executed by a processor, implement the above interaction method.

Some embodiments of the present disclosure further provide a computer program, comprising: instructions that, when executed by a processor, cause the processor to implement the interaction method of any embodiments above.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An interaction method, executed by an electronic device, comprising:

receiving a preset identification character entered by a current user on a target interface of the electronic device;

performing a real-time detection on current target information entered by the current user to determine whether the current target information meets a preset condition;

executing a preset search logic based on the current target information to determine a search result, in response to the current target information not meeting the preset condition, wherein the preset condition is configured to distinguish whether the preset identification character is entered to search another user or is entered only as a character;

displaying the search result at an associated location of the current target information on the target interface of the electronic device; and canceling an execution of the preset search logic and a display of the search result already displayed on the target interface of the electronic device, in response to the current target information meeting the preset condition, wherein the search result comprises a search result list, and displaying the search result at the associated location of the current target information on the target interface of the electronic device comprises:

displaying the search result list at the associated location of an input area for the current target information, wherein information of a plurality of searched users in the search result list is horizontally arranged and displayed at the associated location of the input area for the current target information, and the input area is configured to input the current target information.

2. The interaction method according to claim 1, wherein determining whether the current target information meets the preset condition comprises:

inputting the current target information into a preset network model to determine whether the current target information meets the preset condition through the preset network model.

3. The interaction method according to claim 2, wherein the preset network model is configured to determine whether the current user is based on the preset search logic.

4. The interaction method according to claim 2, wherein inputting the current target information into the preset network model to determine whether the current target information meets the preset condition through the preset network model comprises:

obtaining a determination condition based on the current target information; and inputting the determination condition into the preset network model to determine whether the current target information meets the preset condition through the preset network model.

5. The interaction method according to claim 4, wherein the determination condition comprises at least one of:

a character comprised in the current target information; or a total length of the current target information.

6. The interaction method according to claim 5, wherein inputting the determination condition into the preset network model to determine whether the current target information meets the preset condition through the preset network model comprises:

determining, through the preset network model, whether the character comprises a preset character, wherein the preset character is unrelated to the preset search logic; and determining that the current target information meets the preset condition, in response to the character comprising the preset character.

7. The interaction method according to claim 5, wherein inputting the determination condition into the preset network model to determine whether the current target information meets the preset condition through the preset network model comprises:

determining whether the total length of the current target information reaches a threshold, wherein the threshold is determined based on the preset network model; and determining that the current target information meets the preset condition, in response to the total length of the current target information reaching the threshold.

8. The interaction method according to claim 1, wherein executing the preset search logic based on the current target information to determine the search result comprises:

searching for user information based on the current target information to obtain the search result comprising the user information.

9. The interaction method according to claim 8, further comprising, before an execution of the preset search logic:

determining a user with a frequency of interaction with the current user reaching a frequency threshold as a candidate user; and determining and displaying the search result based on the candidate user.

10. The interaction method according to claim 1, wherein executing the preset search logic to determine the search result comprises:

determining a user of which a user identification with a matching degree of the current target information greater than a preset threshold as a candidate user; and using the candidate user as the search result.

11. The interaction method according to claim 1, wherein executing the preset search logic to determine the search result comprises:

determining a plurality of users with user identifiers matching the current target information by degrees greater than a preset threshold as a plurality of candidate users; and determining the search result based on frequencies of interaction between the plurality of candidate users and the current user.

12. The interaction method according to claim 11, wherein determining the search result based on frequencies of interaction between the plurality of candidate users and the current user comprises:

sorting the plurality of candidate users in a descending order of the frequencies of interaction; and selecting a preset number of top-ranked candidate users as the search result.

13. An electronic device, comprising:

one or more processors;

a storage device for storing one or more programs that, when executed by the one or more processors, cause the one or more processors to implement an interaction method comprising:

receiving a preset identification character entered by a current user on a target interface of the electronic device;

performing a real-time detection on current target information entered by a current user to determine whether the current target information meets a preset condition;

executing a preset search logic based on the current target information to determine a search result, in response to the current target information not meeting the preset condition, wherein the preset condition is configured to distinguish whether the preset identification character is entered to search another user or is entered only as a character;

displaying the search result at an associated location of the current target information on the target interface of the electronic device; and canceling an execution of the preset search logic and a display of the search result already displayed on the target interface of the electronic device, in response to the current target information meeting the preset condition, wherein the search result comprises a search result list, and displaying the search result at the associated location of the current target information on the target interface of the electronic device comprises:

displaying the search result list at the associated location of an input area for the current target information, wherein information of a plurality of searched users in the search result list is horizontally arranged and displayed at the associated location of the input area for the current target information, and the input area is configured to input the current target information.

14. A non-transitory computer-readable storage medium stored thereon a computer program that, when executed by a processor, implements an interaction method comprising:

receiving a preset identification character entered by a current user on a target interface of an electronic device;

performing a real-time detection on current target information entered by the current user to determine whether the current target information meets a preset condition;

executing a preset search logic based on the current target information to determine a search result, in response to the current target information not meeting the preset condition, wherein the preset condition is configured to distinguish whether the preset identification character is entered to search another user or is entered only as a character;

displaying the search result at an associated location of the current target information on the target interface of the electronic device; and canceling an execution of the preset search logic and a display of the search result already displayed on the target interface of the electronic device, in response to the current target information meeting the preset condition, wherein the search result comprises a search result list, and displaying the search result at the associated location of the current target information on the target interface of the electronic device comprises:

displaying the search result list at the associated location of an input area for the current target information, wherein information of a plurality of searched users in the search result list is horizontally arranged and displayed at the associated location of the input area for the current target information, and the input area is configured to input the current target information.

* * * * *